United States Patent [19]
Feng

[11] Patent Number: 5,930,131
[45] Date of Patent: Jul. 27, 1999

[54] CONTROLLING DEVICE FOR CONVERSION OF DC POWER TO SINE WAVE AC POWER

[75] Inventor: Hsiu-Mei Feng, Taipei Hsien, Taiwan

[73] Assignee: Long Well Electronics Corp., Taipei Hsien, Taiwan

[21] Appl. No.: 09/084,935

[22] Filed: May 28, 1998

[51] Int. Cl.$^6$ .......................... H02H 7/122; H02H 7/100
[52] U.S. Cl. ................................... 363/56; 361/18
[58] Field of Search ................... 363/50, 55, 56, 363/95, 97; 361/18, 86, 91, 92

[56] References Cited

U.S. PATENT DOCUMENTS

| | | | |
|---|---|---|---|
| 4,371,824 | 2/1983 | Gritter | 363/56 |
| 4,584,635 | 4/1986 | MacInnis et al. | 363/56 |
| 5,122,726 | 6/1992 | Elliott et al. | 323/272 |
| 5,550,697 | 8/1996 | Green et al. | 361/18 |
| 5,606,244 | 2/1997 | Migdal | 327/7 |

*Primary Examiner*—Matthew Nguyen
*Attorney, Agent, or Firm*—Varndell Legal Group

[57] ABSTRACT

A controlling device for conversion of DC power to sine wave AC power, including a boosting circuit, a sine wave generating circuit, a PWM wave generating circuit, a drive module, an MOSFET output circuit, a filter circuit, a protection circuit and a feedback circuit. The MOSFET output circuit outputs PWM wave by all-bridge type, whereby the safety in operation of the circuit is ensured and sine wave AC current is output.

1 Claim, 11 Drawing Sheets

CONTROLLING DEVICE FOR CONVERSION OF DC POWER TO SINE WAVE AC POWER

BACKGROUND OF THE INVENTION

The present invention relates to a controlling device for conversion of DC power to sine wave AC power, which is applied to control and protect DC/AC converter.

It is known that the general DC/AC converter is a simple uninterruptable system. A battery or other DC power supply provides power for the converter. According to the alternating A phase and B phase generated by PWM (wave width modulation) circuit, the power transistor is driven and serially connected to a middle output transformer to output AC power for external use. The output AC wave form is square wave. The PWM circuit and A, B phase drive circuit may have the following abnormal state during driving of the power transistor:

A phase and B phase are both positive, so that the magnetic fields of the A phase and B phase conflicts with each other and the current abruptly increases to burn down the power transistor. A phase is normal, while B phase fails to work or A phase fails to work, while B phase is normal. This leads to serious magnetic deflection and great increment of driving current. This may burn down the power transistor.

One of A phase and B phase has too long wave width or is positive during a long period or is positive at normal time. This leads to electromagnetization of the silicon-steel plate, total loss of coil inductance, abrupt increment of current and burning down of power transistor.

The square wave generated by A phase or B phase will also generate a considerably strong electromagnetic wave which will interfere with other peripheral electric appliance. For example, the television will suffer interference of oblique stripes.

SUMMARY OF THE INVENTION

It is a primary object of the present invention to provide a controlling device for conversion of DC power to sine wave AC power, in which a protection device detects whether the output AC power is normal or not. In the case of overload of output, the circuit is opened and disabled so as to protect the power transistor from burning down to cause accident. Furthermore, the AC current has sine wave form identical to that of domestic power so that no electromagnetic interference will take place.

According to the above object, the controlling device of the present invention includes a boosting circuit, a sine wave generating circuit, a PWM wave generating circuit, a drive module, a MOSFET output circuit, a filter circuit, a protection circuit and a feedback circuit. The sine wave generating circuit is connected to the PWM wave generating circuit which is connected to the drive module, the boosting circuit and the drive module are connected to input end of the MOSFET output circuit, the output end thereof being connected to the protection circuit and feedback circuit, whereby the boosting circuit, sine wave generating circuit and PWM wave generating circuit cooperate with the drive module and MOSFET output circuit and filter circuit to filter the wave and output 60 Hz or 50 Hz sine wave to complete the DC/AC conversion, the output cooperates with the feedback circuit to feed back a part of the signal to the sine wave generating circuit to generate complete sine wave signal, the protection circuit serves to detect overload at the output end.

The present invention can be best understood through the following description and accompanying drawings, wherein:

BRIEF DESCRIPTION OF THE DRAWINGS

FIG. 5-1 shows the wave forms of the output ends A, B of the PWM generating IC;

FIG. 5-2 shows the wave forms of the output ends C, D of the OPA operation amplifier;

DETAILED DESCRIPTION OF THE PREFERRED EMBODIMENT

Figure 1:
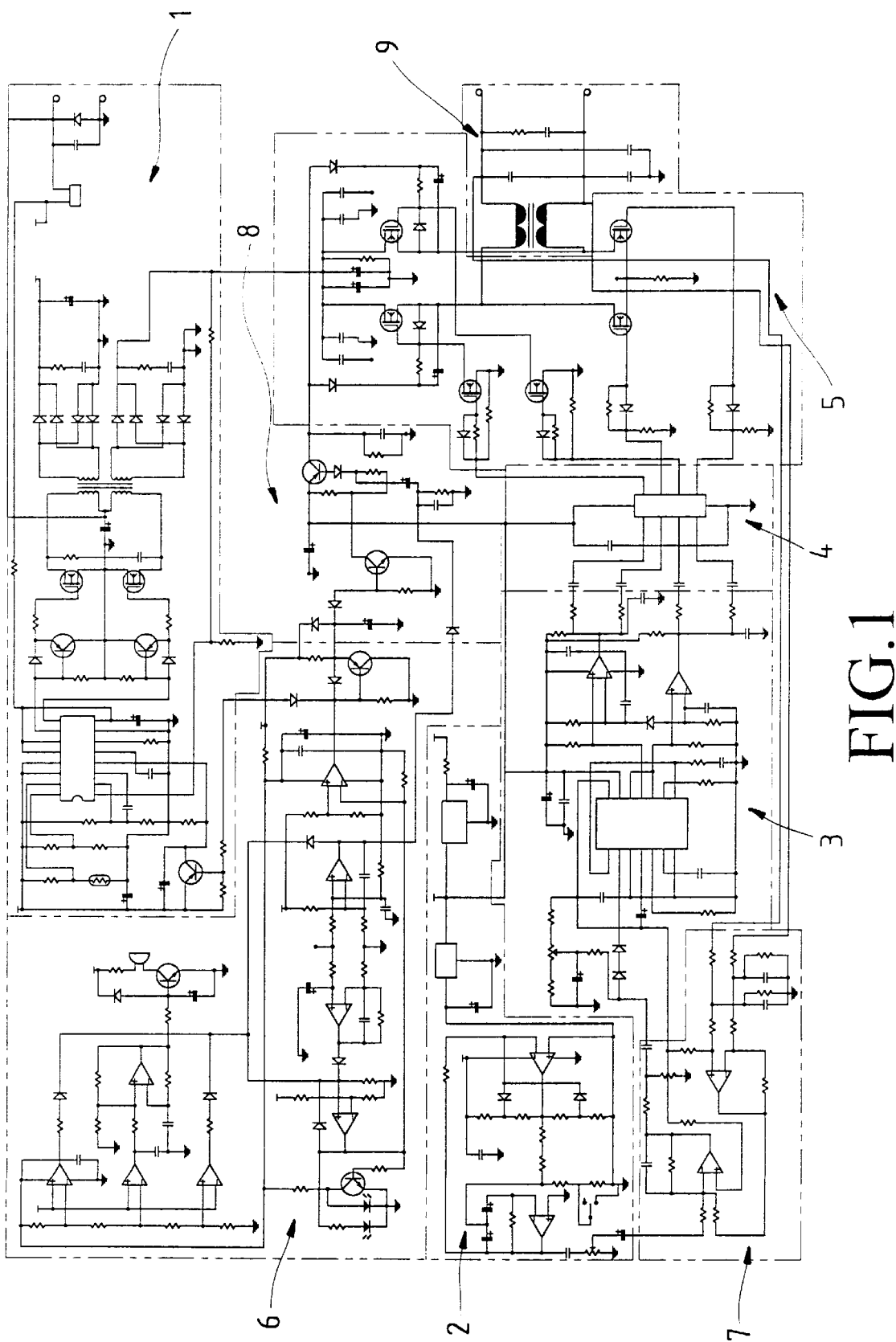
FIG. 1 is a circuit diagram of the present invention.

Please refer to FIG. 1. The present invention includes a boosting circuit 1, a sine wave generating circuit 2, a PWM wave generating circuit 3, a drive module 4, a MOSFET output circuit 5, a protection circuit 6, a feedback circuit 7, a warming-up circuit 8 and a filter circuit 9.

The boosting circuit 1 serves to increase the input low DC voltage to 220 V high voltage.

The sine wave generating circuit 2 serves to generate sine wave.

The PWM wave generating circuit 3 generates triangular wave which is compared with the sine wave.

The drive module 4 serves to drive the all-bridge MOSFET output circuit 5.

The MOSFET output circuit 5 serves to output PWM wave by all-bridge type, whereby the PWM wave is with sine wave form.

The protection circuit 6 serves to detect overload and whether the input DC voltage is too high or too low.

The feedback circuit 7 serves to make the sine wave generating circuit 2 generate stable sine wave.

After the PWM IC normally operates, the warming-up circuit 8 then activates the MOSFET so as to achieve the object of protection.

The filter circuit 9 serves to filter PWM high frequency wave form to output 50 Hz or 60 Hz sine wave.

Figure 2:
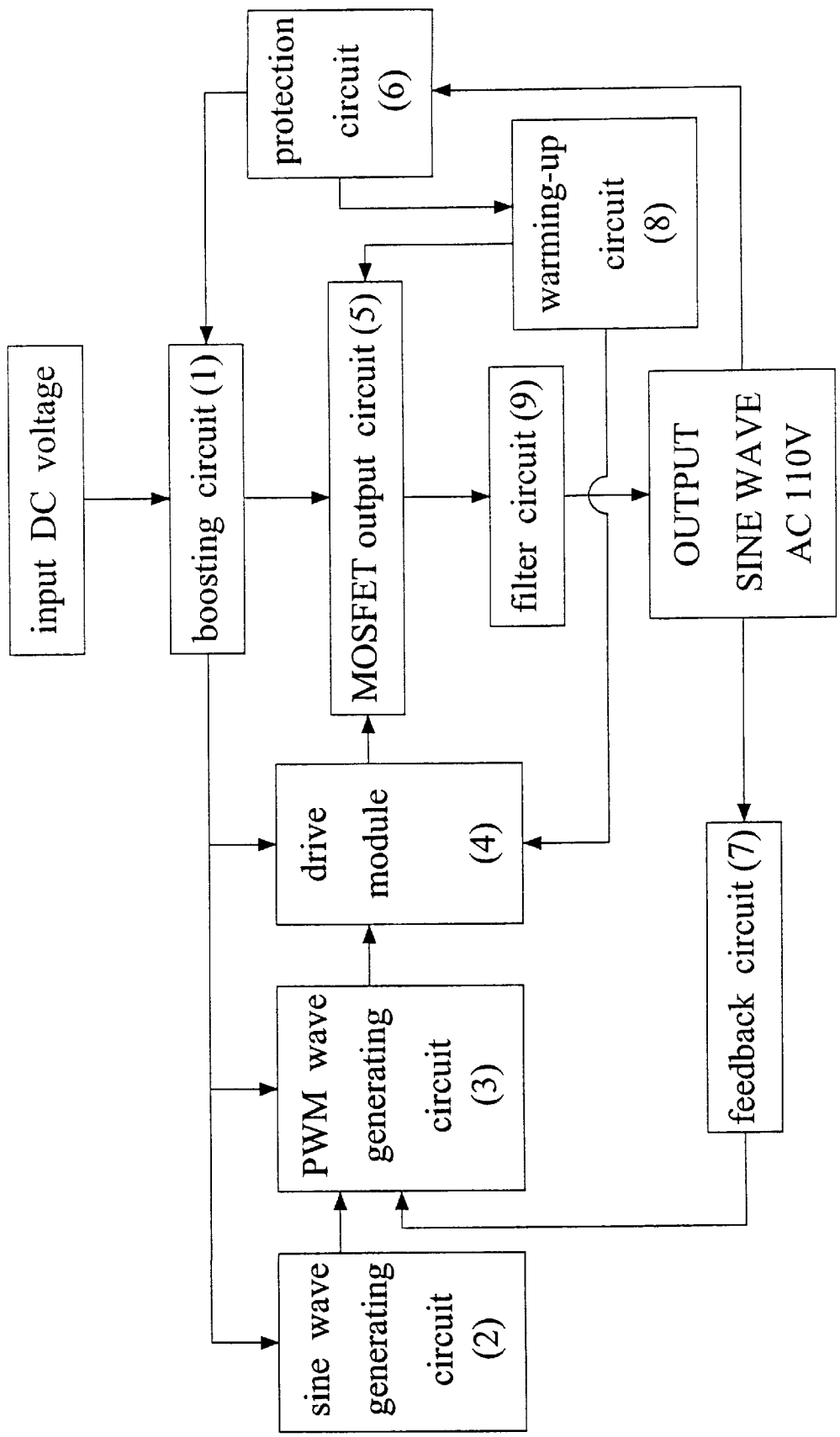
FIG. 2 is a block diagram of the present invention.
Figure 3:
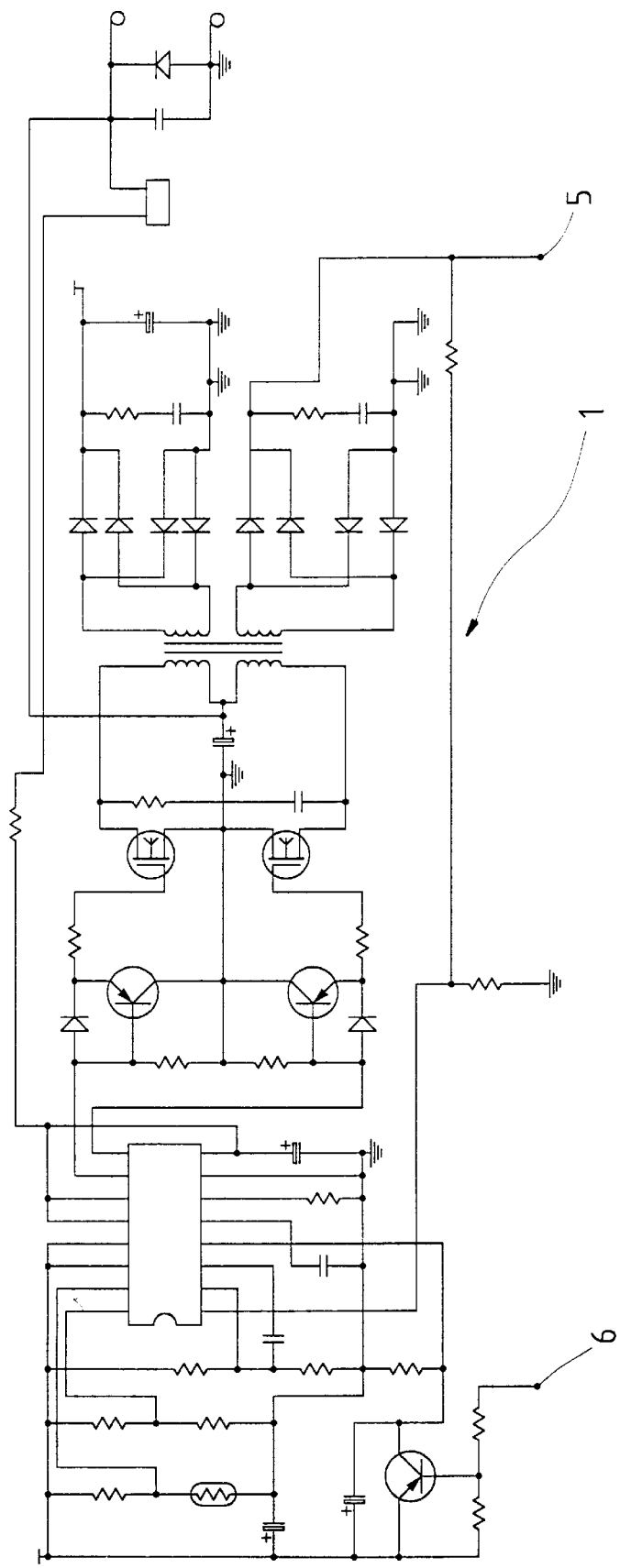
FIG. 3 is a circuit diagram of the boosting circuit of the present invention.
Figure 4:
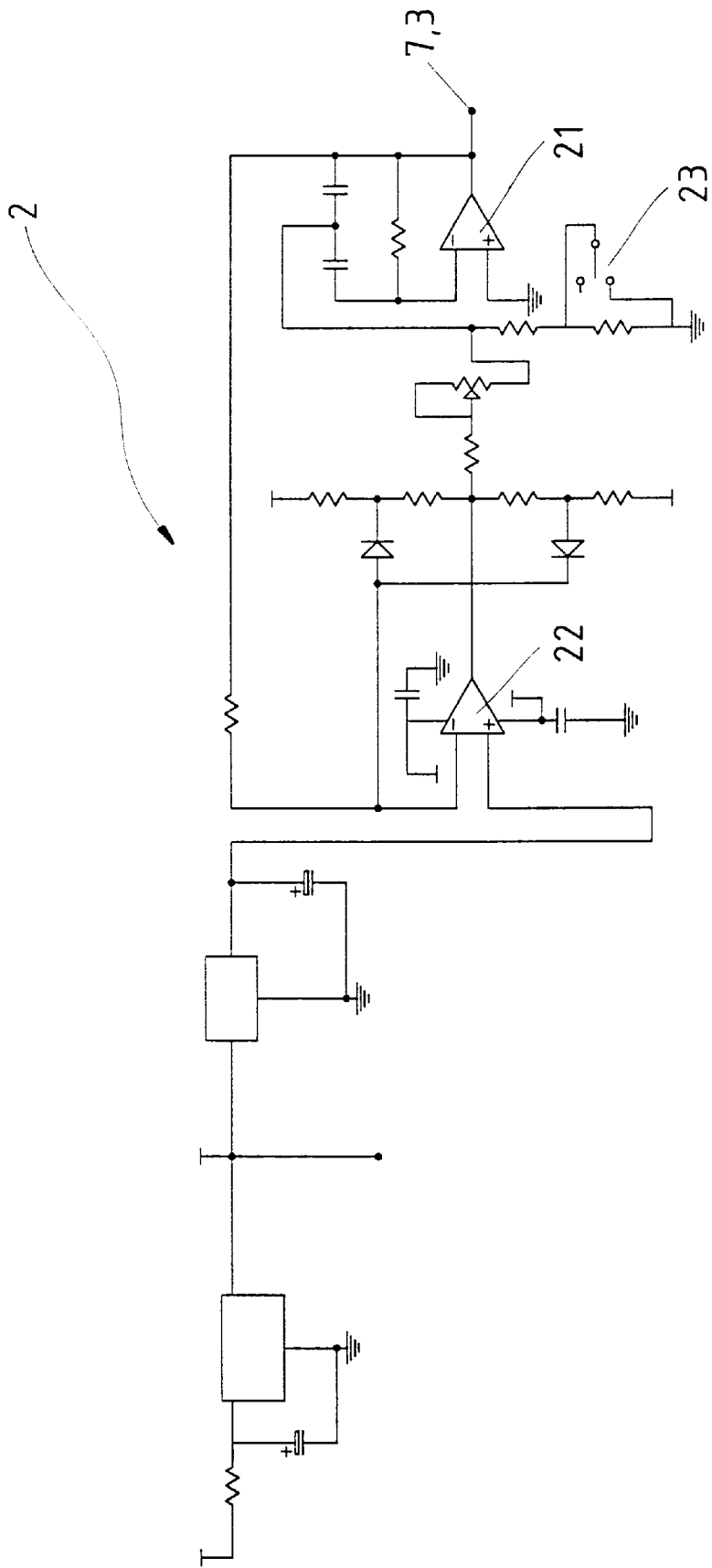
FIG. 4 is a circuit diagram of the sine wave generating circuit of the present invention.

Referring to FIG. 2, the input DC current is boosted by the boosting circuit 1 from DC 12 V to DC 220 V. At the same time, the sine wave generating circuit 2 generates a sine wave input to the PWM wave generating circuit 3. At this time, the warming-up circuit 8 is in a standby state. After the PWM normally works, then the MOSFET is activated to work so as to achieve the object of protection. At this time, the triangular wave generated by the PWM generating circuit 3 itself is compared with the sine wave so as to obtain the PWM wave. Via the drive module 4, the PWM wave drives the all-bridge MOSFET output circuit 5. The MOSFET output circuit 5 outputs a PWM wave with sine wave, which is filtered by the filter circuit 9 to obtain 110 V AC current. A little part of the 110 V AC current is fed back into the sine wave generating circuit 2 through the feedback circuit 7. In the case of overload of the output end, the protection circuit 6 is activated to make the drive module 4 and the MOSFET output circuit 5 in a standby state without electric connection. The circuit is prevented from completely operating until the voltage of the boosting circuit is increased back to DC 220 V.

Please refer to FIGS. 3 to 11. The boosting circuit 1 is composed of 16 resistors, 11 capacitors, 10 diodes, four metal-oxide-semiconductor field effect transistors, three transistors, one boosting IC 11 and a transformer 12. The boosting circuit 1 serves to increase the input 12 V voltage to 220 V.

The sine wave generating circuit 2 is composed of two OPA operation amplifiers 21, 22, two diodes, 9 resistors, one variable resistor, three capacitors and a wave form selection switch 23 which form an oscillator only needing DC power and having positive feedback to oscillate the selected signal (such as 50 Hz or 60 Hz sine wave).

Figure 5:
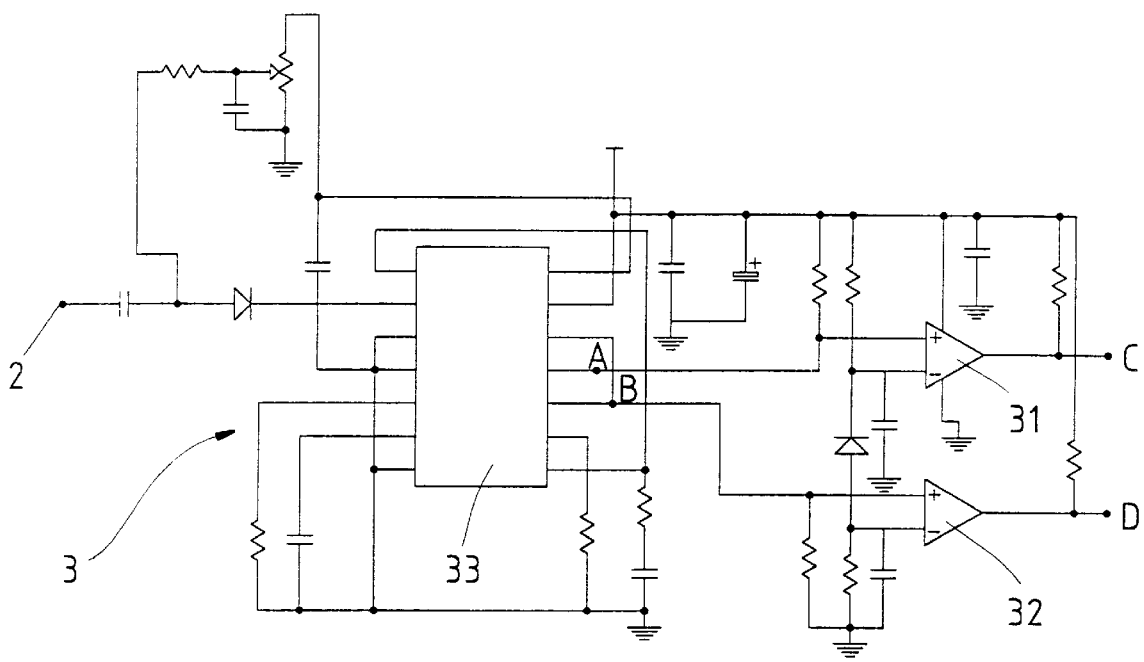
FIG. 5 is a circuit diagram of the PWM wave generating circuit of the present invention.
Figures 1, 5:
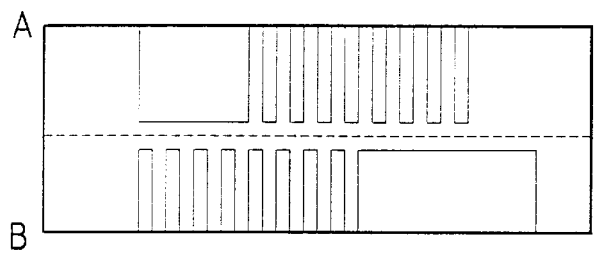
Figures 2, 5:
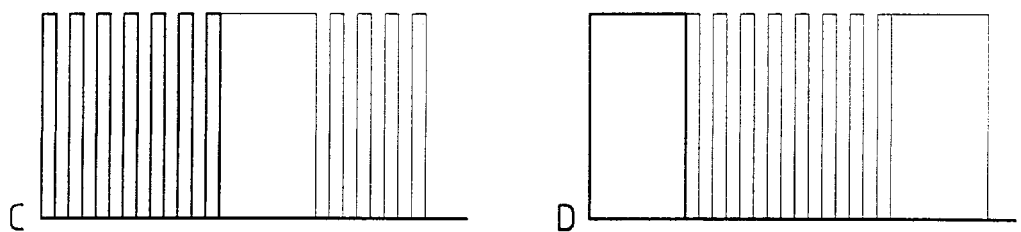
Figure 6:
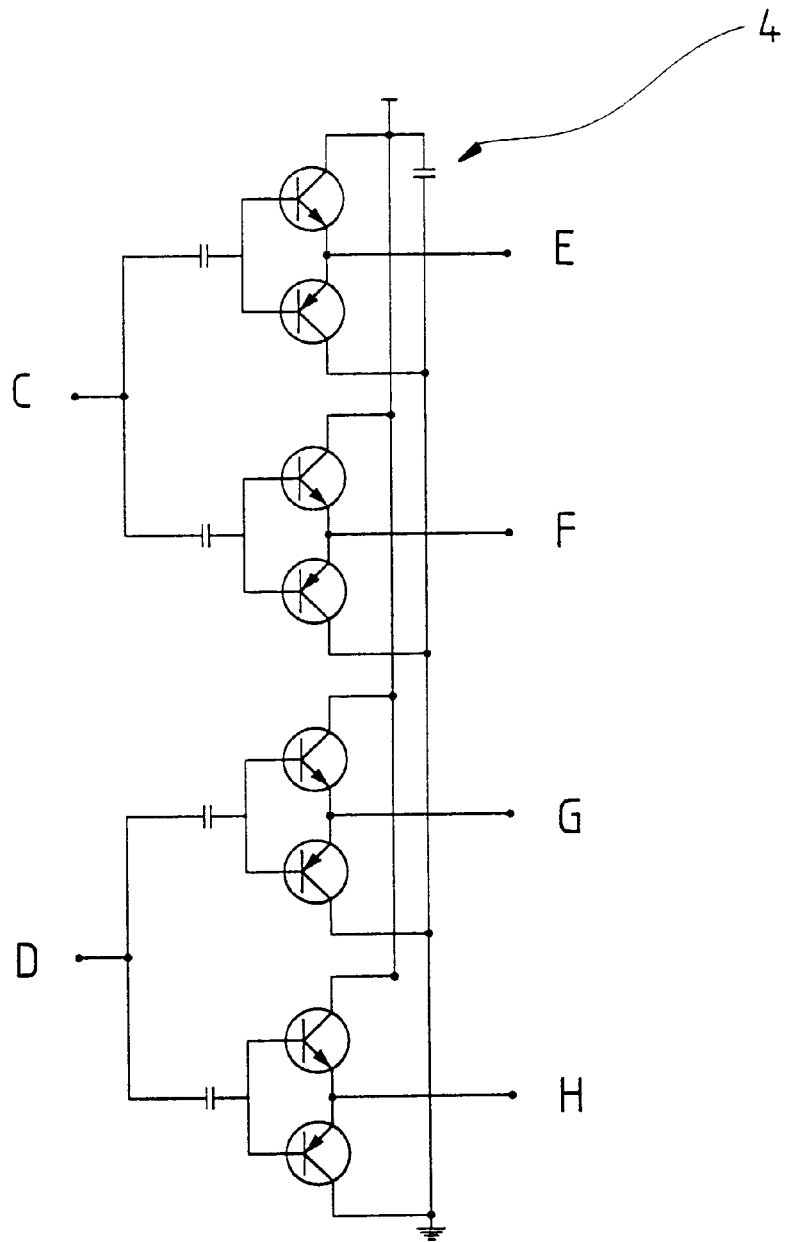
FIG. 6 is a circuit diagram of the drive module of the present invention.
Figure 7:
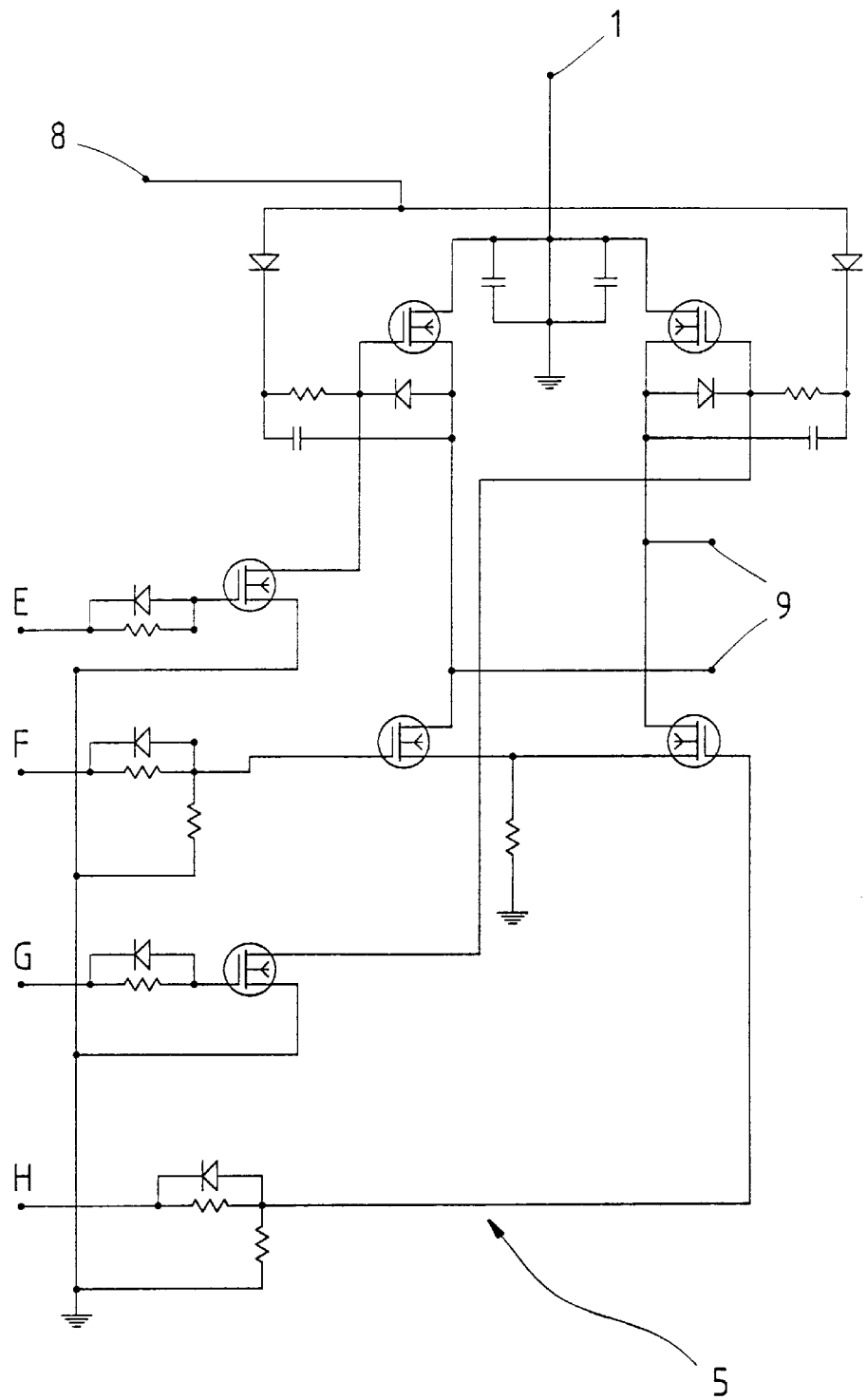
FIG. 7 is a circuit diagram of the MOSFET output circuit of the present invention.
Figure 8:
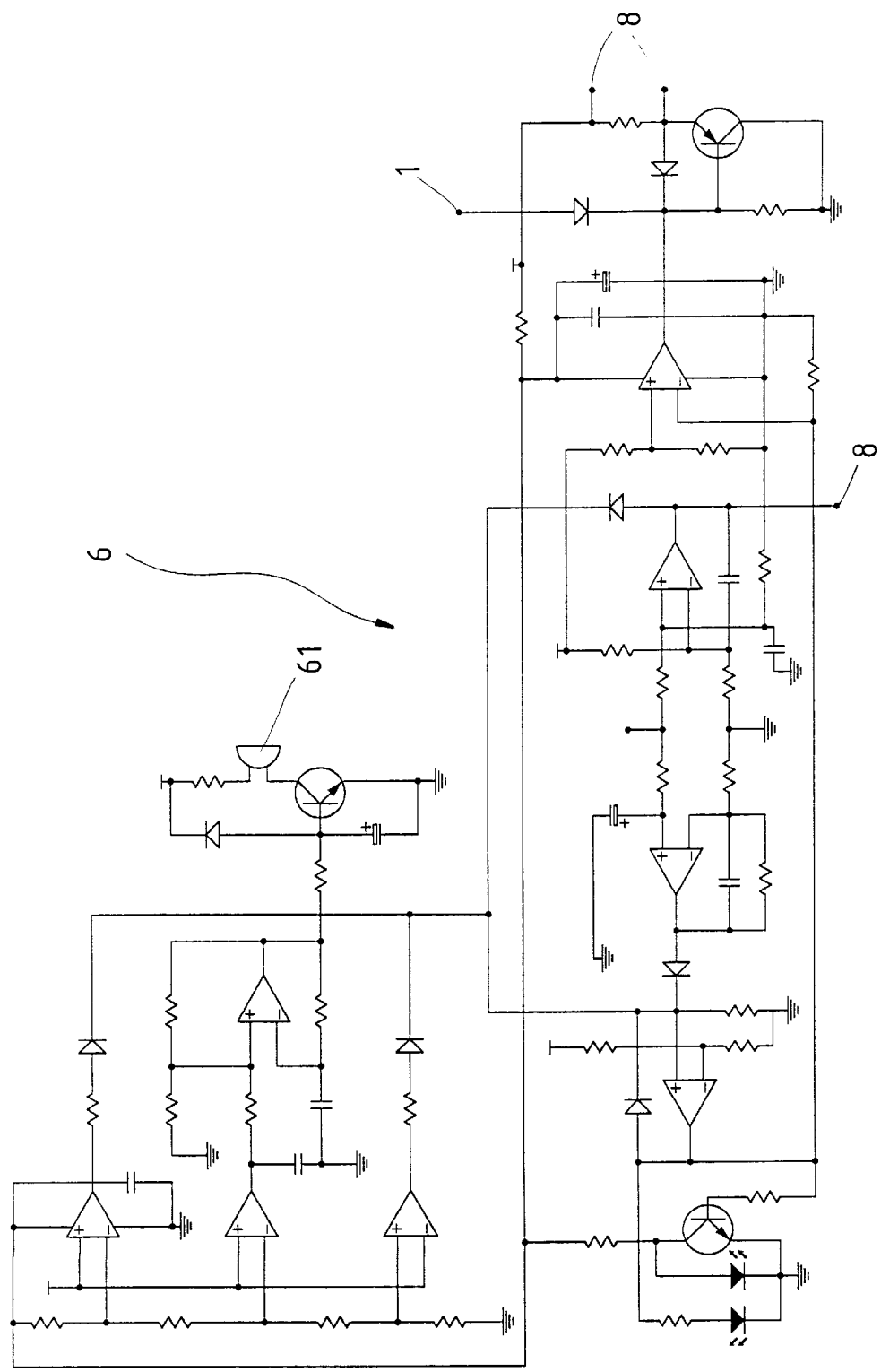
FIG. 8 is a circuit diagram of the protection circuit of the present invention.
Figure 9:
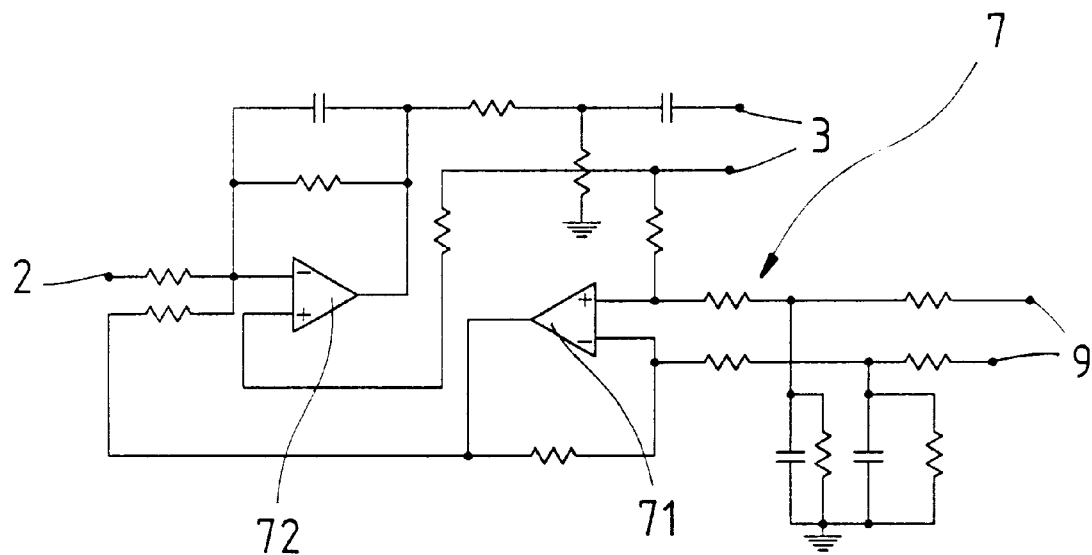
FIG. 9 is a circuit diagram of the feedback circuit of the present invention.
Figure 10:
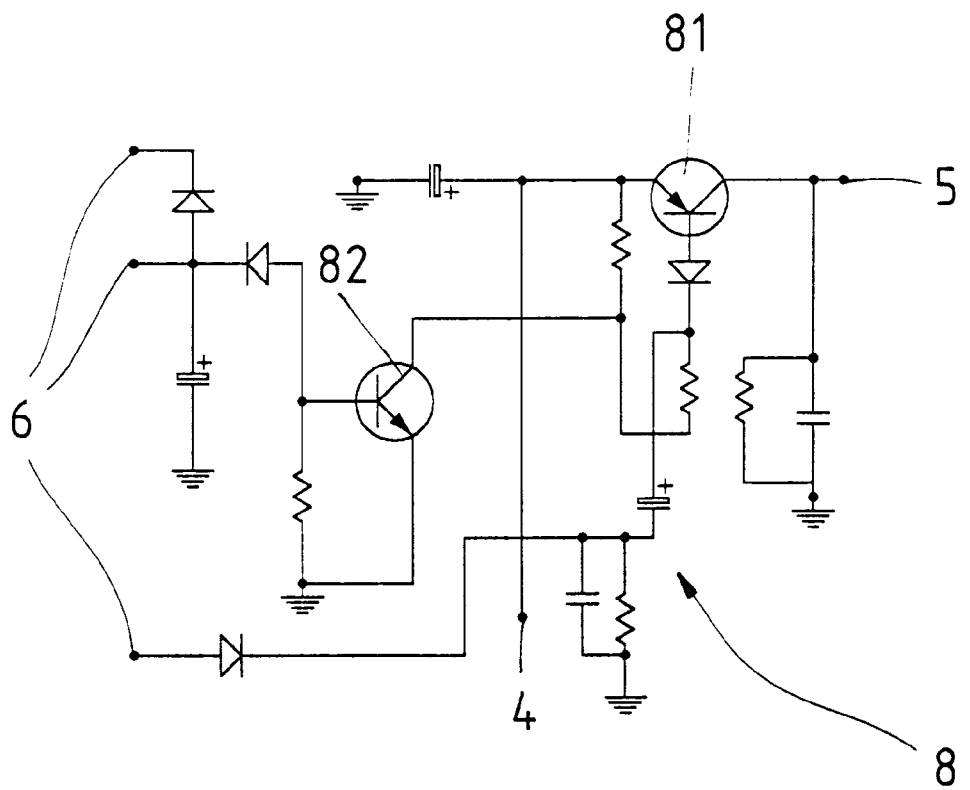
FIG. 10 is circuit diagram of the warming-up circuit of the present invention.
Figure 11:
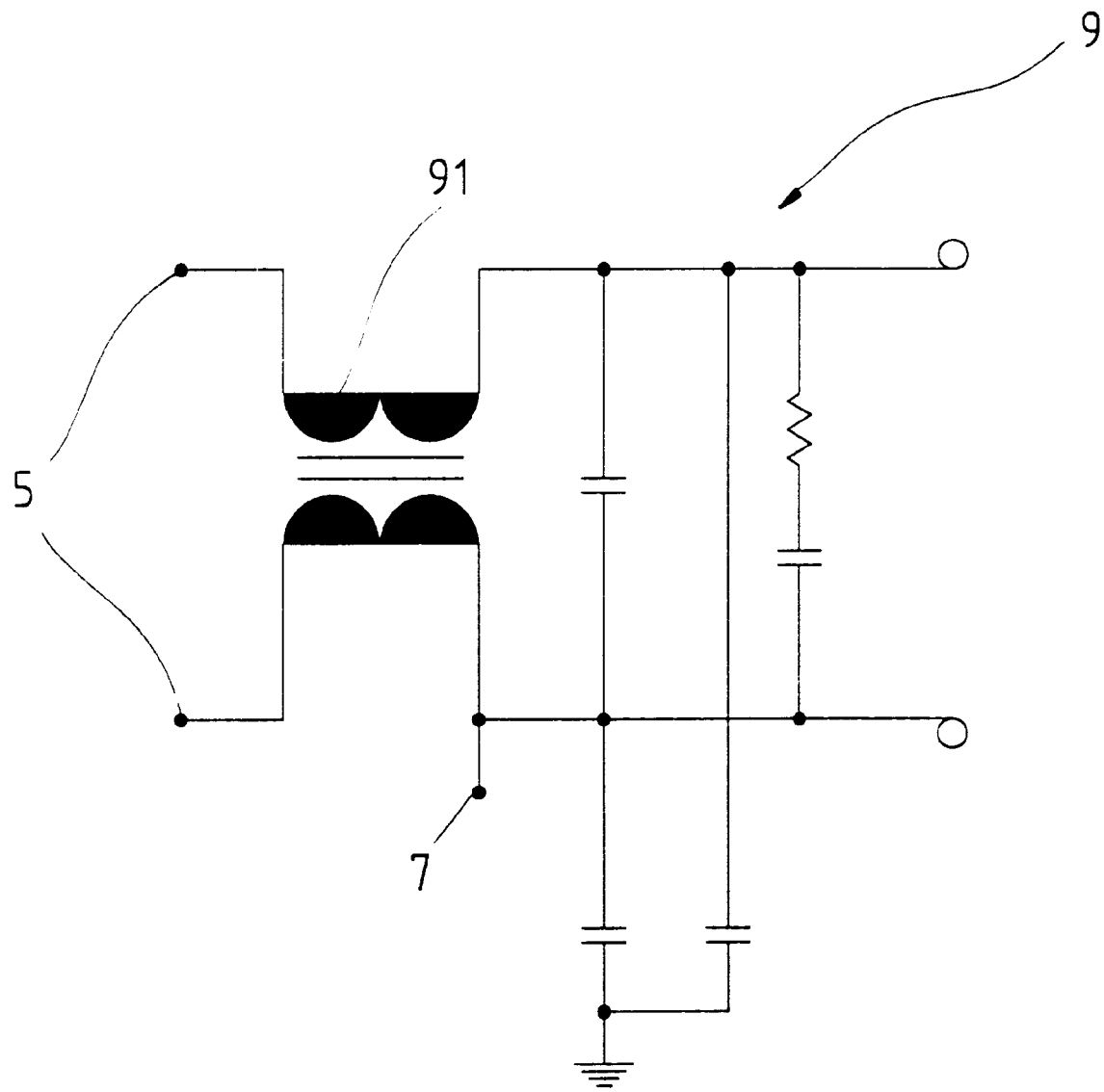
FIG. 11 is a circuit diagram of the filter circuit of the present invention.

The PWM generating circuit 3 is composed of 10 resistors, one variable resistor, 9 capacitors, one diode, one Zener diode, two OPA operation amplifiers 31, 32 and one PWM generating IC 33. The sine wave generated by the sine wave generating circuit 2 is compared with the triangular wave generated by the PWM wave IC 33 so as to generate two PWM wave phases with different potentials (as shown in FIG. 5-1). One is high potential, while the other is low potential. Two kinds of potentials are processed by the OPA operation amplifiers 31, 32 to obtain the wave form as shown in FIG. 5-2.

The drive module 4 is composed of 8 transistors and 4 capacitors. Via the amplifiers formed by each two transistors, the drive module 4 serves to divide the wave form output from two ends of the PWM generating circuit 3 into four output ends E, F, G, H.

The MOSFET output circuit 5 is composed of 6 metal-oxide-semiconductor field effect transistors, 17 resistors, 10 diodes, 13 capacitors, 4 Zener diodes, one inductor and 7 IC. The signal is input from four output ends E, F, G, H of the drive module 4 and the all-bridge type MOSFET output the PWM wave with the sine wave form. After filtered by the filter circuit 9 composed of one inductor 91, four capacitors and one resistor, 110 V AC current is output.

The feedback circuit 7 is composed of one resistor, four capacitors and two OPA operation amplifiers 71, 72. A part of the signal output from the MOSFET output circuit 5 is fed back to the sine wave generating circuit 2 to generate stable sine wave.

The protection circuit 6 is composed of 8 OPA amplifiers, 4 transistors, 27 resistors, 12 capacitors, 10 diodes, two IC, two LED and one buzzer 61. In the case of overload of output end, the protection circuit 6 is activated to disconnect the drive module 4 from the MOSFET output circuit 5 and keep them in a standby state. They can further work only when the voltage of the boosting circuit 1 is further increased to 220 V.

The warming-up circuit 8 is composed of two transistors 81, 82, 5 capacitors, 5 resistors, three diodes and one Zener diode.

According to the above arrangement, the boosting circuit, sine wave generating circuit, PWM wave generating circuit, drive module and all-bridge type MOSFET output circuit of the present invention output signal and the cooperative protection circuit and feedback circuit serve to effectively control the operation, whereby it is safer to convert the DC voltage into sine wave AC voltage.

It should be noted that the above description and accompanying drawings are only used to illustrate one embodiment of the present invention, not intended to limit the scope thereof. Any modification of the embodiment should fall within the scope of the present invention.

What is claimed is:

1. A controlling device for conversion of DC power to sine wave AC power, comprising:

a boosting circuit serving to increase the input low DC voltage to high DC voltage;

a sine wave generating circuit for generating sine wave;

a PWM wave generating circuit generating triangular wave which is compared with the sine wave;

a drive module for driving an all-bridge type MOSFET output circuit;

a MOSFET output circuit for outputting PWM wave by all-bridge type, whereby the PWM wave is with sine wave form;

a protection circuit for detecting overload and whether the input DC voltage is too high or too low;

a feedback circuit enabling the sine wave generating circuit to generate stable sine wave;

a filter circuit for filtering PWM high frequency wave form to output sine wave; and a warming-up circuit which, after it is ensured that an integrated circuit of the PWM wave generating circuit normally operates, activates the MOSFET so as to achieve the object of protection; wherein the sine wave generating circuit is connected to the PWM wave generating circuit which is connected to the drive module, the boosting circuit and the drive module being connected to input end of the MOSFET output circuit, an output end of the controlling device being connected to the protection circuit and feedback circuit, whereby the boosting circuit, sine wave generating circuit and PWM wave generating circuit cooperate with the drive module and MOSFET output circuit and filter circuit to filter the wave and output 60 Hz or 50 Hz sine wave to complete the DC/AC conversion, the output cooperating with the feedback circuit to feed back a part of the signal to the sine wave generating circuit to generate complete sine wave signal, the protection circuit serving to detect overload at the output end.

* * * * *